United States Patent Office 2,802,040
Patented Aug. 6, 1957

2,802,040

LATEX TREATMENT

Walter T. L. Ten Broeck, Jr., Serbalawan, Indonesia, assignor, by mesne assignments, to The Goodyear Tire & Rubber Company, a corporation of Ohio No Drawing. Application April 16, 1953,
Serial No. 349,299

1 Claim. (Cl. 260—820)

This invention relates to the preservation of natural rubber latex and is particularly concerned with increasing the mechanical stability properties of latex and stabilizing the KOH value or acidity.

Latex as obtained from the rubber tree is a complex dispersion of low stability consisting of solids dispersed in an aqueous medium in the relationship of about 35% solids to 65% liquid. Generally about 5% of the solids are nonrubber solids, which include mineral salts, resins, sugars and proteins. The protein is generally considered to surround the rubber globules and to undergo putrefaction on standing, thus resulting in coagulation of the rubber. It is therefore necessary to add a preservative, such as ammonia, to latex.

It is also known to preserve latex with formaldehyde, the formaldehyde tending to destroy bacteria and enzymes which increase the acidity of the latex in the course of time. Thus, formaldehyde-preserved latex thickens with age and soon becomes unmanageable. This is probably due to the fact that the use of formaldehyde usually results in a latex acidity of pH 6.5 or lower and therefore causes partial coagulation. Also, formaldehyde-preserved latex displays a serious lack of mechanical stability.

Various attempts have been made to combine the desirable effects of formaldehyde and ammonia in latex, but such attempts have not been satisfactory because formaldehyde and ammonia react to form hexamethylene tetramine which inactivates the formaldehyde and thus inhibits its desired action on enzymes and bacteria which are present in the latex.

It will thus be seen that present methods of preserving natural rubber latex are unsatisfactory in one way or another and efforts to devise a better method are beset with difficulties. Latex preserved with ammonia alone gradually increases in acidity due to putrefaction caused by bacteria and enzymes and the latex is eventually partially coagulated by the acid thus formed; latex preserved with formaldehyde alone also tends to acidify on aging and soon thickens so that it cannot be used as latex. Ammonia and formaldehyde cannot both be added to the latex in order to accomplish destruction of bacteria and maintenance of alkalinity because they react to form hexamethylene tetramine and the formaldehyde is inactivated. While it has been proposed to utilize a fixed alkali and formaldehyde to accomplish the desired result because the fixed alkali does not react with the formaldehyde, it is generally undesirable to add such fixed alkalis to latex in large amounts because the metallic radicals of the alkali cannot subsequently be removed by evaporation as in the case of ammonia. High sodium or potassium content in latex interferes with processing latex, e. g. processing latex into foamed latex sponge.

Excess metallic ions in the latex repress the action of the gellants used in processing thus requiring an excess amount for the desired result.

The use of phosphates is undesirable because ammonium phosphate is formed which acts as a secondary gellant and thus tends to destabilize the latex. Also, phosphates react with metallic ions and water thus forming acidic metallic phosphates and phosphoric acid which tend to coagulate the latex.

The present invention overcomes these difficulties and provides a process by which field latex can be preserved for long periods of time with good mechanical stability and without the introduction of objectionable amounts of metallic ions.

It is therefore a general object of this invention to provide an improved process for preserving field latex.

It is a further object of this invention to provide a process for treating latex wherein greater and more uniform mechanical stability is attained than heretofore possible.

It is a more specific object of this invention to provide an improved process for preserving field latex wherein strong caustic is added to the latex for preliminary preservation.

It is a further object of this invention to provide a latex having new and improved characteristics.

In the practice of this invention natural rubber latex is treated with a fixed alkali, the treatment being effected as soon after tapping as possible. The fixed alkali can be any of the strong alkalis such as the alkali metal hydroxides, particularly sodium and potassium hydroxides. Although the strong alkali metal hydroxides are preferred, other alkalis, excepting ammonium hydroxide, may also be used if undesirable side reactions do not occur. Sufficient alkali must be added to maintain the pH of the latex above 9.0 but a large excess of strong alkali must not be added because, as mentioned, it has the undesirable property of introducing metallic ions into the latex where they are available to react or interfere with compounding ingredients later added to the latex. For the same reason, a strong alkali, rather than a weak one, is utilized in the preferred form of the invention since less of it is required to lower the hydrogen ion concentration of the latex.

A quantity of strong base or alkali must be added which is sufficient to precipitate all of the magnesium and calcium ions which are present in the latex, but which does not add unnecessary, undesirable metal ions from the hydroxide.

The quantity of strong alkali required for this purpose will vary with the variations in latex composition. Customarily, enough strong caustic to maintain the pH at 9.0 is necessary for complete sludge removal either by centrifuging or by sedimentation. Usually, when the pH is maintained by means of added strong alkali, it should be kept below 11.5 in order to keep the amount of excess metallic ions low. In the preferred practice the pH is maintained within a range of about 9.5 to 10.5.

Latex normally contains undesirable ions such as divalent ions, e. g. Mg, Ca, etc. which are undesirable because they react with natural fats in latex to form insoluble soaps and may also react in a similar manner to destroy or kill the soap effect during processing when soluble soaps are desired. By using monovalent metal hydroxides as taught by this invention, processing is actually improved because the addition later of some fatty acid or fatty acid emulsion, e. g. oleic, stearic, palmitic, etc., completes the preparation of desirable soluble soaps in situ.

The monovalent metallic ions which are higher in the activity series will replace the undesirable divalent ions such as Mg and Ca which are present in the latex in the form of metal salts. The divalent metals will thus form insoluble hydroxides which can be easily removed from the latex prior to concentration.

The range of pH values preferably should be maintained between 9.5 pH and 10.5 pH in order to provide the desired characteristics. If the caustic used is sodium hydroxide and the latex is the customary 36% latex, about 0.23 to 0.30% NaOH based on the weight of the total latex present will elevate the pH to about 9.5 to 10.5, the range which provides the desired qualities. The amount of strong caustic required will vary roughly in proportion to the water/rubber relationship of the latex. The figures shown above will vary for other strong caustics, e. g., KOH, in proportion to the molecular weights. If desired, a portion of the alkalinity may be provided by ammonia which may be added before or after concentration but after complete magnesium and calcium precipitation and sludge removal.

A further advantage of the invention is manifested with respect to latices obtained from plantings of high-yielding rubber clones, variations in latex properties having arisen because specific characteristics are manifested in certain clonal trees. For example, latex properties depend, not only on prompt and effective latex preservation, but also on the inorganic content, e. g. calcium, magnesium, and various phosphates, such content varying from clone to clone. When ammonia is used for latex preservation, the metallic ions, such as those of magnesium and calcium, will be precipitated as metallic ammonium phosphates, e. g., $MgNH_4PO_4$. If there is an insufficient phosphate content in the latex to combine with all the metallic ions, the excess soluble metallic ions may remain in the latex after concentration and thus cause the latex to have poor mechanical stability as well as causing lack of uniformity of product.

This difficulty is avoided when strong alkali, e. g., NaOH, is used in place of ammonia since the latex will then contain free hydroxyl ions and these throw down a precipitate of insoluble polyvalent metal hydroxides and polyvalent metal phosphates, thus effecting complete removal of the undesirable ions because a balance between the metal and phosphate content is not required. In this manner complete sludge removal is possible.

For this purpose a sodium hydroxide content of 0.20 to 0.30% on the weight of field latex with a pH range of 9.5 to 10.5 is specified.

The following table illustrates testing of the invention:

*Daily pH values of field latex treated with NaOH*

TABLE

| Sample | Percent NaOH on Latex | Daily pH Values | | | | | | |
|---|---|---|---|---|---|---|---|---|
| | | 0 | 1 | 2 | 3 | 4 | 5 | 6 | 7 |
| A-1 | 0.10 | 7.6 | Coagulated | | | | | | |
| B-1 | 0.15 | 9.05 | ___do___ | | | | | | |
| C-1 | 0.20 | 9.6 | 6.7 | discarded | | | | | |
| D-1 | 0.25 | 10.00 | 7.85 | ___do___ | | | | | |
| E-1 | 0.30 | 10.55 | 10.32 | 8.5 | 6.95 | discarded | | | |
| F-1 | 0.35 | 11.09 | 10.77 | 10.70 | 10.50 | 9.25 | 7.45 | discarded | |
| G-1 | 0.40 | 11.55 | 11.25 | 11.20 | 11.10 | 11.15 | 10.90 | ___do___ | |

These results show that 0.20% NaOH is sufficient to prevent coagulation during preliminary treatment of the latex and that 0.40% elevates the pH to a point which is the maximum required for complete polyvalent ion precipitation and sludge removal.

Similar tests have been conducted using potassium hydroxide instead of sodium hydroxide. These tests have indicated that similar desirable characteristics are imparted to the latex. When the production of foam is contemplated, it is desirable to use KOH, even though it is more expensive than NaOH, because it provides potassium ions for the formation of desirable potassium soaps. However, a greater concentration of potassium hydroxide is necessary to insure complete sludge removal with consequent low coagulum and sludge content in the cream.

The sodium or potassium content of the latex is maintained at an acceptable low concentration for subsequent latex end use by virtue of the fact that during latex concentration the added sodium or potassium is removed in proportion to the latex water content removed during concentration. For example, when a 36% total solids content latex is concentrated to 62% total solids content, at least 65% of the water and of the water soluble materials are removed. Thus the original low alkali content of the latex is further reduced by 65%.

This invention is further characterized by the addition of $NH_3$ to the latex, after desludging, as a means for maintaining the pH of the latex alkaline during storage and shipment. The $NH_3$ can be driven off before the latex is to be used, thus providing a pure latex with a minimum of undesirable ions. If the latex is concentrated by centrifuging, the ammonia required will be added immediately after centrifuging. If the latex is concentrated by creaming, the ammonia may be added before creaming or after creaming. Usually the latex will be preserved by adding about 1.5 to 2.0% ammonia based on the water content. Part or all of the ammonia may be added before or after concentration, but always after sludge removal. The actual amount would thus depend on the water content, latex customarily being concentrated to about 65% solids prior to storage and shipment.

The latex products of this invention have many varied uses such as film coating of various materials, fabrication of dipped articles, cord or fabric impregnation, and the production of foamed rubber. Due to the conditions necessary for proper foam formation this invention is particularly useful and perhaps finds its greatest utility in that field.

While certain representative embodiments and details have been shown for the purpose of illustrating the invention, it will be apparent to those skilled in this art that various changes and modifications may be made therein without departing from the spirit or scope of the invention.

I claim:

In the process of preparing fresh natural rubber latex for storage and shipment which includes the steps of alkalizing the latex, desludging and concentrating and adding further alkali, the improvement consisting of preliminarily treating fresh nonammoniated latex with from 0.2 to 0.4% by weight of an alkali metal hydroxide selected from the group consisting of sodium hydroxide and potassium hydroxide, based on the weight of the latex.

References Cited in the file of this patent

UNITED STATES PATENTS

| 1,980,599 | Scholz | Nov. 13, 1934 |
| 2,004,156 | Cake | June 11, 1935 |
| 2,219,469 | Cake et al. | Oct. 29, 1940 |
| 2,303,430 | Braak | Dec. 1, 1942 |

FOREIGN PATENTS

| 450,435 | Great Britain | July 17, 1936 |